Figure 1:
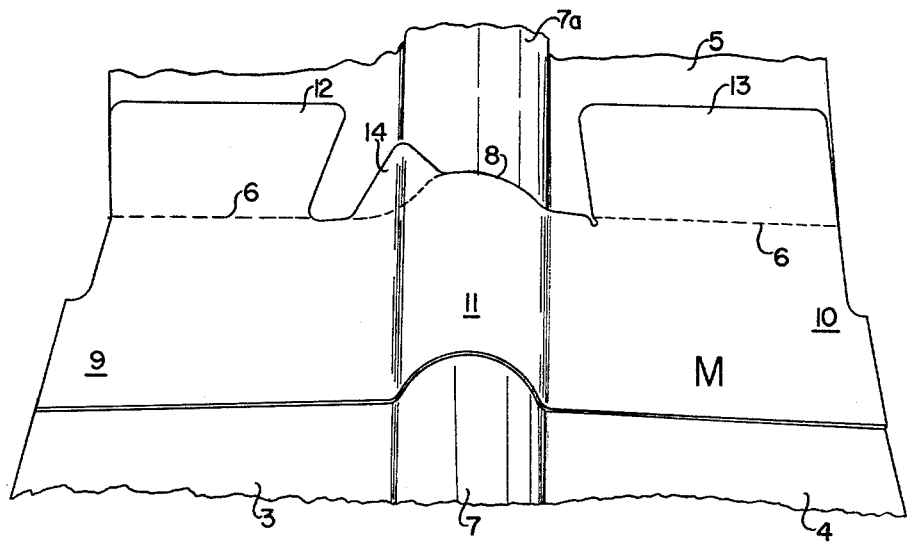

Sept. 4, 1962 J. J. McBRIDE 3,052,314
AUTOMOBILE FLOOR MAT
Filed Feb. 14, 1961

INVENTOR.
JACK J. McBRIDE
BY
Oberlin, Maky & Donnelly
ATTORNEYS

United States Patent Office 3,052,314
Patented Sept. 4, 1962

3,052,314
AUTOMOBILE FLOOR MAT
Jack J. McBride, Barberton, Ohio, assignor to Seiberling Rubber Company, Barberton, Ohio, a corporation of Delaware
Filed Feb. 14, 1961, Ser. No. 89,246
3 Claims. (Cl. 180—90.6)

The present invention relates to an automobile floor mat and, more particularly, to such a mat of flexible material which is self-contouring and adapted snugly to fit the irregularly shaped floor area in a driver's compartment of an automobile.

It is emphasized that heretofore in order to fit properly a one-piece mat of rubber or like material to an automobile floor, it has been necessary to shape the mat by a molding or equivalent operation in order to impart a desired contour which corresponds to that of the floor.

The floor of a driver's compartment, whether it be the single compartment in a single seated automobile or the forward compartment in the case of a double seated car, has for many years presented a special problem when it comes to fitting thereto a mat of this kind, whether applied directly to the floor or to protect the carpet with which such floor may be covered. Thus the floor, in addition to comprising level portions to accommodate the feet of the driver and companion, regularly includes a forwardly extending inclined portion or toeboard as well as a central longitudinal raised portion, or so-called transmission hump. Heretofore in order properly to fit a one-piece mat of rubber or rubber-like material to such floor, it has been found necessary to shape it by molding or equivalent operation to give it a contour corresponding to that of such floor.

With the advent of automobile design in which the center of gravity has been almost continuously lowered and accordingly the floor of the automobile also, it has been necessary to place the transmission virtually at floor level. As a result automobiles have a large grotesquely protruding hump at the center of the front seat or driver's compartment of the car. The art has literally struggled with this problem from the 1930's to produce a mat which is simple and inexpensive to manufacture and yet which neatly conforms to and fits the irregularly shaped and humped automobile floor.

It became the practice as the art of making automobile floor mats developed to use preshaped or contour mats which ride over the hump. To accomplish this, it was necessary to use complex forms and apparatus which vulcanized a mat directly in a mold. Such devices were complex, bulky, and expensive. Nevertheless, many patents were granted in the late 1930's and still later which relate to apparatus and techniques of this type for making contour mats. Reference is made for example to the following United States patents and the complex apparatus and techniques that represent the manner in which mats seeking to solve the above discussed problem were produced: No. 2,134,754 to Flint et al.; No. 2,160,-182 to Vrooman; No. 2,188,342 to England; No. 2,183,-984 to Campbell; and No. 2,230,128 to Blair et al.

As new automotive models were introduced (with still lower centers of gravity), this humped configuration was carried farther up onto the toeboard area itself. This structure only further aggravated the ill-fitting conditions in which a floor mat was expected to lie evenly over the automobile floor without buckling, folding, wrinkling, etc.

Although the present floor mat embodies an easily manufactured one-piece construction, it uniquely solves all of the indicated problems and is readily installed in all late model cars. The present mat includes a number of interrelated sections, each of which readily conforms to the area assigned to it, whether a floor board area, a toeboard area, or a hump area, without causing buckling or any unevenness between any of such sections. It is emphasized that such floor board, toeboard and hump areas, particularly in late model cars, are variously if not grotesquely related and often of arcuate configuration.

An object of the present invention is, therefore, to provide a mat that, while retaining the advantage of being made in one piece, nevertheless readily accommodates itself to the floor in question, is readily removable when desired, and at the same time conforms to the indicated irregular contour of the floor.

Another object is to provide such a mat having a self-contouring extension which fits without wrinkling or buckling along a side margin of an automobile transmission hump to serve as an accelerator scrape pad.

Other objects of the invention will become apparent as the description proceeds.

To the accomplishment of the foregoing and related ends, the invention consists of the features hereinafter fully described and particularly pointed out in the claims, the annexed drawing and following disclosure describing in detail the invention, such drawing and disclosure illustrating, however, but one or more of the various ways in which the invention may be practiced.

Figure 2:
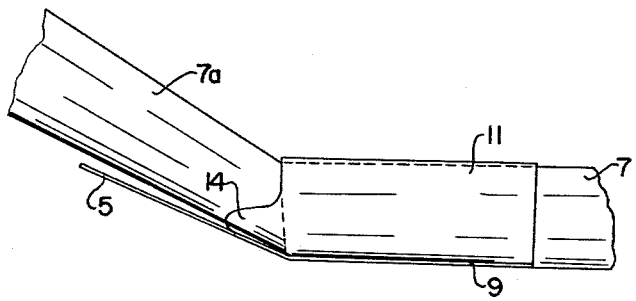

In the annexed drawing:

FIGURE 1 is a perspective view of the present mat overlying an automobile floor; and FIGURE 2 is a fragmentary view looking substantially at right angles to the left-hand portion of FIGURE 1 and illustrates an accelerator scrape pad nesting along the irregularly shaped area where a transmission hump and toeboard intersect.

Referring to the drawing, an exemplary automobile floor for which the present mat is adapted comprises two spaced-apart plane portions 3 and 4, an inclined toeboard 5 which angularly intersects the plane portions 3 and 4 along the dotted lines 6, and a central longitudinal hump 7 of generally arcuate cross-section. The hump 7 extends forwardly between the plane floor portions 3 and 4 and may intersect the toeboard portion 5 along a generally curved line of intersection or may continue, as illustrated, up the toeboard portion 5 as an extension 7a of the hump, usually of somewhat smaller radius. In this case, the hump 7 and hump extension 7a intersect along a generally curved line here illustrated at 8 which in the embodiment illustrated coincides with the forward edge of the mat hereinafter described. Whether the automobile floor contains a hump extension or not, a marginal side of the hump 7, or hump extension 7a where one appears, creates a most irregularly shaped area, namely, the area where the hump 7 or 7a or both, toeboard portion 5 and plane portion 3 converge.

The present mat M may be composed of suitable flexible material such as rubber, synthetic or natural, or resinous materials such as polyvinyl chloride. The mat comprises a single sheet which is non-contoured out of a flat plane. Two spaced-apart sections 9 and 10 of generally rectangular form lie over the plane portions 3 and 4, respectively, of the automobile floor. A flexible intervening section 11 joins the plane sections 9 and 10 and is integral with the adjacent edges thereof. The connecting intervening portion 11 fits snugly over the transmission hump 7 in the automobile floor when the sections 9 and 10 are located on the plane portions 3 and 4, respectively, on each side of such hump.

The mat further comprises integral portions 12 and 13 which project forwardly from the plane sections 9 and 10, respectively, and are bendable relatively thereto so as to be adapted to rest upon the inclined toeboard portion 5. The extent of such bendable or hinging portions of the mat as well as the outline thereof may, if desired, be varied more or less to fit closely the corresponding portions of the toeboard encountered in conventional automobile design. Thus the portion or section 12 may be somewhat shorter than the section 13 so as not to interfere with the clutch and brake pedals that ordinarily project through the toeboard 5 on the left-hand side of the compartment as viewed in FIGURE 1.

In addition, the mat M has a self-contouring substantially triangular extension 14 spaced between and unattached to the plane sections 12 and 13. The extension 14 has one side integral with a forward edge of a marginal side of the intervening section 11 as illustrated in FIGURE 1, the extension 14 being secured to the forward edge of the mat to some extent along the section 9 as well. When the mat is placed upon an automobile floor as described, the extension 14 overlies without wrinkling or buckling the most irregularly shaped area formed by the convergence of three or more floor areas, for example, the toeboard section 5, the hump 7a, the hump 7, and the section 3. In practice, the extension 14 serves as an accelerator scrape pad, the extension receiving the frictional wear as by the back and forth movement of a shoe of the driver.

From the foregoing, it will be seen that the present mat may be made in flat form by conventional molding or press operation, and being in such flat form the mats may be readily stacked in storage, or compactly rolled up for the purpose of shipment. At the same time, when the mat is applied to the irregularly shaped floor of the driver compartment of an automobile, it will accommodate itself more readily thereto than will a mat that has been shaped, necessarily with some latitude, to the contour of the floor. The accelerator scrape pad formed by the extension 14 also protects the underlying portion of the hump, particularly if carpeted, from wear due ordinarily to frequent use of an accelerator pedal.

It will be understood that the upper or exposed surface of the mat when laid on the floor will ordinarily be corrugated, or otherwise formed, both in order to minimize slipping of the user's feet thereon, as well as to present an ornamental appearance.

Other forms embodying the features of the invention may be employed, change being made as regards the features herein disclosed, provided those stated by any of the following claims or the equivalent of such features be employed.

I therefore particularly point out and distinctly claim as my invention:

1. A flat molded, one-piece accessory automobile floor mat, non-contoured out of a flat plane and adapted to acquire the configuration of an automobile floor comprising two plane portions, an inclined toeboard portion contiguous with each such plane portion, and a central longitudinal hump located between such plane and toeboard portions, said mat comprising two substantially plane sections for covering the plane portions of the floor, an intervening section integral with and joining adjacent areas of said plane sections, said intervening section normally constituting a planar continuation of said plane sections but being sufficiently flexible to be adapted snugly to enclose the hump of said floor and thereby become deformed to an arcuate shape transversely of said intervening section while retaining said plane sections in a fixed position relatively to each other, a further substantially plane section flexibly connected to the forward edge of each of said first-named plane sections, said further plane sections being unattached to each other and spaced apart a distance somewhat greater than the width of such hump and without contact therewith, and an extension spaced between said further plane sections integral with a forward edge of a marginal side of said intervening section, whereby upon said mat being applied to such floor said intervening section may assume the configuration of said hump and individual positioning of said further plane sections over the corresponding sections of the toeboard of such floor is permitted without interference with each other or contact with said hump on said toeboard, and said extension overlies without wrinkling an irregularly shaped area defined by the intersection of the toeboard portion and the central longitudinal hump.

2. A flat molded, one-piece accessory automobile floor mat, non-contoured out of a flat plane and adapted to acquire the configuration of an automobile floor comprising two plane portions, an inclined toeboard portion angularly intersecting each such plane floor portion, and a central longitudinal hump located between such plane floor portions and extending upon and intersecting the inclined toeboard portion to define a line of intersection along a side of the central longitudinal hump, said mat comprising two substantially plane sections for covering the plane portions of the floor, an intervening section integral with and joining adjacent areas of said plane sections, said intervening section normally constituting a planar continuation of said plane sections but being sufficiently flexible to be adapted snugly to enclose the hump of said floor and thereby become deformed to an arcuate shape transversely of said intervening section while retaining said plane sections in a fixed position relatively to each other, a further substantially plane section flexibly connected to the forward edge of each of said first-named plane sections, said further plane sections being unattached to each other and spaced apart a distance somewhat greater than the width of such hump and without contact therewith, and a substantially triangular extension spaced between and unattached to said further plane sections integral with a forward edge of a marginal side of said intervening section, whereby upon said mat being applied to said floor said intervening section may assume the configuration of said hump and individual positioning of said further plane sections over the corresponding sections of the toeboard of such floor is permitted without interference with each other or with said hump on said toeboard, and said extension overlies with wrinkling an area defined by the mutual convergence of contiguous parts of the central hump, toeboard hump, toeboard portion, and a plane portion of said automobile floor.

3. A flat molded, one-piece accessory automobile floor mat, normally non-contoured out of a flat plane but adapted for universal application to acquire the configuration of any automobile floor comprising in general two spaced-apart plane portions, an inclined plane toeboard portion angularly intersecting each such plane floor portion, and a central longitudinal hump of arcuate transverse cross-section located between such plane floor portions and extending forwardly thereof upon and intersecting said inclined toeboard portion, said mat comprising two substantially plane sections for covering such plane floor portions, an intervening section integral with and joining adjacent edges of said plane sections, said intervening section normally constituting a planar continuation of said plane sections but being sufficiently flexible to be adapted snugly to enclose such hump between such plane floor portions and thereby become deformed to an arcuate shape transversely of said intervening section while retaining such plane sections of said mat in a fixed position relatively to each other, a further substantially plane section flexibly connected to the forward edge of each of said first-named plane mat sections, said further plane sections being unattached to each other and spaced apart a distance greater than the width of the extension of such hump upon the inclined toeboard portion of such floor, and a self-contouring substantially triangular extension spaced between and unattached to said further plane sections, said triangular extension being integral along one side thereof with a forward edge of a marginal side of said intervening section, whereby upon said mat being applied to such floor said intervening section thereof may assume the configuration of such hump and individual positioning of said further plane sections of said mat over the corresponding plane sections of the toeboard portion of such floor is permitted without interference with each other or with the extension of such hump upon the inclined toeboard portion of such floor, and said self-contouring extension overlies without wrinkling a length of the irregularly shaped area defined by the common intersection of the central longitudinal hump and the inclined toeboard portion to define an accelerator scrape pad.

References Cited in the file of this patent

UNITED STATES PATENTS

| | | |
|---|---|---|
| 1,994,145 | Moule | Mar. 12, 1935 |
| 2,444,342 | Edwards | June 29, 1948 |
| 2,505,554 | Kravitz | Apr. 25, 1950 |
| 2,793,149 | Richter | May 21, 1957 |